United States Patent [19]

Hoshino

[11] Patent Number: 4,756,639

[45] Date of Patent: Jul. 12, 1988

[54] CONNECTING STRUCTURE FOR FURNITURE AND DISPLAY STAND PIPES

[75] Inventor: Yoshihiro Hoshino, Nagoya, Japan

[73] Assignee: Hoshino Gakki Co., Ltd., Japan

[21] Appl. No.: 925,819

[22] Filed: Oct. 30, 1986

[30] Foreign Application Priority Data

Jun. 24, 1986 [JP] Japan ............... 61-96607[U]

[51] Int. Cl.⁴ ............... F16B 7/02; F16B 12/36
[52] U.S. Cl. ............... 403/297; 403/306; 403/362; 403/183
[58] Field of Search ............... 403/297, 292, 306, 301, 403/308, 300, 362, 180, 183, 230, 5, 184, 182, 263, 314, 287, 328, 407.1

[56] References Cited

U.S. PATENT DOCUMENTS

| | | | |
|---|---|---|---|
| 1,363,140 | 12/1920 | Merritt | 403/314 X |
| 2,214,177 | 9/1940 | Raybould | 403/297 |
| 2,446,406 | 8/1948 | Beyerle | 403/286 |
| 2,496,032 | 1/1950 | Austin | 403/230 |
| 2,720,405 | 10/1955 | Kennedy | 403/183 |
| 2,881,018 | 4/1959 | Carlson et al. | 403/180 |
| 2,904,379 | 9/1959 | Nelson | 403/297 |
| 3,980,408 | 9/1976 | Jachmann | 403/362 X |
| 4,701,065 | 10/1987 | Orosa | 403/407.1 X |

Primary Examiner—Randolph A. Reese
Assistant Examiner—Peter M. Cuomo
Attorney, Agent, or Firm—Ostrolenk, Faber, Gerb & Soffen

[57] ABSTRACT

A connector for connecting longitudinally arranged pipes comprises a respective plug insertable at the end of each of the pipes. A resilient compressive member carried by each plug is disposed further inside each pipe. A respective plate covers each compressive member. A tightening screw on each plug forces the plate toward the compressive member and against the plug and thus spreads the compressive member to substantially integrate the plug at each end of the connector with its pipe. Set screws fix the positions of the plugs axially in the pipes and also urge the connector into each pipe, which urges the outward faces of the plugs into contact and locks the pipes together.

14 Claims, 3 Drawing Sheets

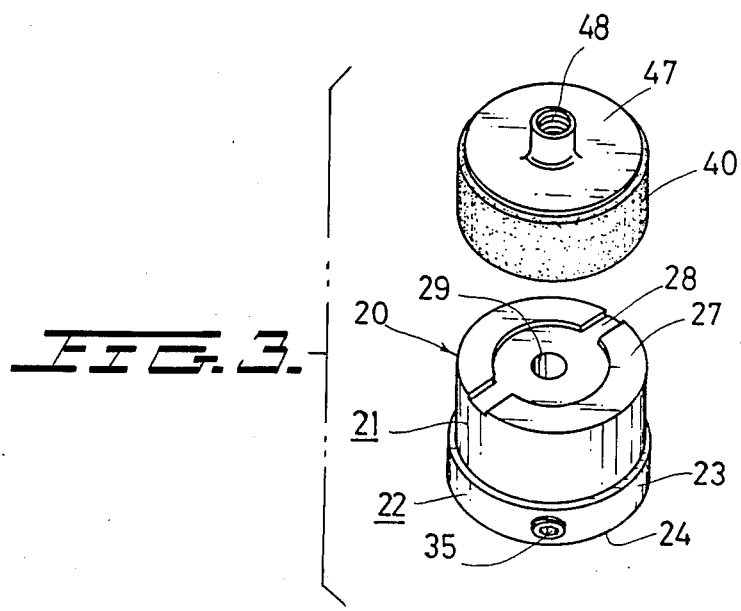
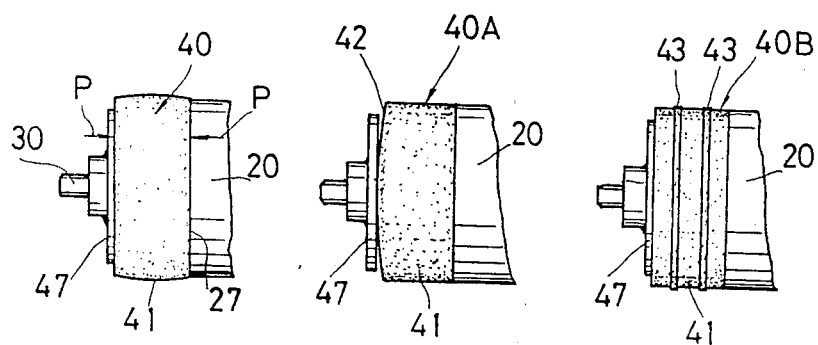
FIG. 4.  FIG. 5.  FIG. 6.

CONNECTING STRUCTURE FOR FURNITURE AND DISPLAY STAND PIPES

BACKGROUND OF THE INVENTION

The present invention relates to a connector for pipe-like members which members are used as a support structure for various assembled furniture pieces, showcases or display devices.

In the manufacture of various types of furniture, usually metal furniture, display stands, showcases and similar structures, standardized pipe elements of standardized length are employed. However, it is rare that standardized lengths of pipe have the exact measurements required for the structure and appearance of the furniture, display stand or showcase or similar devices erected from such pipe structures.

The present invention avoids the need for initially casting, shaping or forming support pipes to exact measurements. The present invention thus permits the use of pipes that have been formed to approximate measurements and of pipes which have been cut to approximate size from available stock rather than requiring that the pipes be made exactly to order.

In previous structures with longitudinally interconnected pipes, it is difficult to maintain the strength, rigidity, and fixed relationship of the joined parts. In most cases, the joint does not have sufficiently high strength for the load that is to be imposed on the pipes, and the finished assembly does not have a structure which is non-bendable or which cannot be twisted. It has been difficult to obtain a structure which is both sufficiently rigid and strong, yet which can be dismantled after assembly and use, if necessary. Prior devices have used welds or other permanent or semipermanent structures to interconnect the pipes. But, it has been difficult to interconnect the pipes such that they would be as strong as required, and to also have the pipes easily disassembled.

SUMMARY OF THE INVENTION

The object of the present invention is to provide a structure at a joint or interconnection of pipes which meets strength requirements, including high joint strength, and a structure in which the parts will not slip, bend or twist with respect to each other.

Another object of the present invention is to provide such a structure which enables both assembly and dismantling by simplified operation, wherein only an apparently minor part need be operated to effect either full engagement or disengagement.

A further object of the present invention is to provide such a structure in which the interconnecting means does not damage the pipes which are to be interconnected, that is it avoids damage to the external surfaces and appearance of the pipes, and it also avoids deformation of the pipes due to strains which are produced at the inner side of the pipes as a result of the interconnection.

The connector structure of the invention extends in the direction of the two pipes, whereby the structure does not project out of or appear on the surfaces of the pipes. The connector structure comprises an end bushing that includes a plug which is inserted into the end of each pipe and rests against the inner pipe surface. To each plug is attached a brim part that projects out of the open end of the pipe. The brim part has an outer peripheral surface which has the same shape and size as the outer tubular surface of the pipe. A cavity extends axially inwardly from the axially outside terminal face of the brim part along the direction of the axis of the pipe. A tightening screw extends from inside the bottom surface of the cavity through the axially inside terminal face of the plug.

A compressive stopper member comprised of an elastomeric material is arranged between the inside terminal face of the plug and a tightening seat plate beyond the stopper member. The tightening screw extends to and is received in the plate. The stopper member is compressed and swells or deforms to press against the inner tubular surface of the pipe due to compression by the tightening seat plate through tightening of the tigntening screw. This fixes the plug in the pipe and effectively integrates each plug into its pipe. The dangers of the pipe terminal end or of its inner surface being damaged or deformed are reduced, as compared with prior art devices.

A connecting rod extends between and is inserted into each cavity in the end bushing. The rod includes a respective fixing part which is disposed within each cavity. A set screw runs radially from the outer peripheral surface of the brim part into the cavity of the plug, and the set screws engage the fixing parts of the rod which completes the structure of the connector.

The possibilities of damaging the pipes or of damaging the connecting parts are avoided with the invention. Damage to the external surface of the pipes, such as caused by screw holes and other elements is prevented. It also prevents deformations which would be produced from the inner surface of the pipe and which have an adverse effect on the pipes.

Since the compressive stopper members are firmly compressed to the inner tubular surfaces of the pipes, the connector has great strength against drawing in the direction of the pipe, bending in a direction at right angles to the axis of the pipe and twisting in a circumferential direction with respect to the pipe. For this reason, the connector can be used for various household furniture pieces, for showcases or displays or other support structures.

BRIEF DESCRIPTION OF THE DRAWINGS

The foregoing and other objects and features of the invention will become apparent in the following description of the accompanying drawings in which:

FIG. 3 is an exploded view of the end bushing and compressive stopping member.

FIG. 4 is a side view of a portion of FIG. 3 showing the compressed deformed state of the compressive stopper member.

FIG. 5 is a side view showing another condition of the compressive stopper member.

FIG. 6 is a side view showing a still further condition of the compressive stopper member.

BRIEF DESCRIPTION OF THE PREFERRED EMBODIMENT

Figure 1:
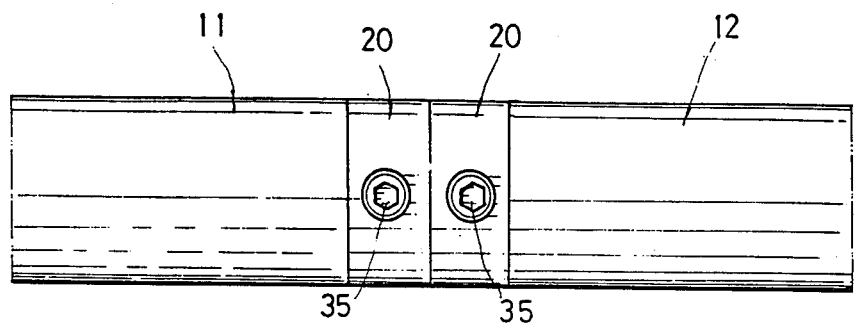
FIG. 1 is a front view of the interconnected structure for two longitudinally adjacent pipe elements.

The following briefly describes the invention prior to a full description thereof.

The connecting structure for pipes 11, 12 extends longitudinally of the pipes. Each structure 20 comprises an end bushing comprised of a plug 21 which is inserted into the open end of and engages the inner tubular surface 15 of each of the pipes 11, 12. Each end bushing 20 has an axially outward brim 22 having an outer peripheral surface 23 of the diameter and shape of the outer surface 16 of the respective adjacent pipe. A bore or cavity 25 is formed in the axially outside, transverse side terminal face 24 of the brim part 22, facing the other pipe. A tightening screw 30 extends through the inside terminal face 27 of the plug 21 and into the bottom 26 in the cavity 25.

A set screw 35 extends radially from the outer peripheral surface 23 of the brim 22 into the cavity 25.

A compressive stopper member 40 is arranged between the axially inside, transverse side terminal face 27 of the plug 21 and the tightening seat plate 47. The end bushing 20 is held by the compression of the stopper member 40 against the pipe inner tube surface 15 resulting from the compressive deformation of the member 40 by the tightening seat plate 47 caused by the tightening of the tightening screw 30.

A longitudinally symmetric connecting rod 50 is inserted into the cavities 25 in the end bushings 20. Fixing parts 51, 52 on the rod 50 are to be engaged by set screws 35 held in the brims 22. The screws 35 push into the respective fixing parts, and this pushes the facing axial faces 24 of the brims 22 together, completing the connector.

DETAILED DESCRIPTION OF THE PREFERRED EMBODIMENT

Referring to FIG. 1, the connecting structure of the invention connects two pipes 11 and 12, comprised of stainless steel, aluminum, or the like. The connecting structure does not deform the pipes or damage them, as by requiring a screw hole. The connecting structure includes as its main members an end bushing 20 at each end, a respective compressive stopper member 40 for each bushing 20, and a connective rod 50 extending between the end bushings.

Figure 2:
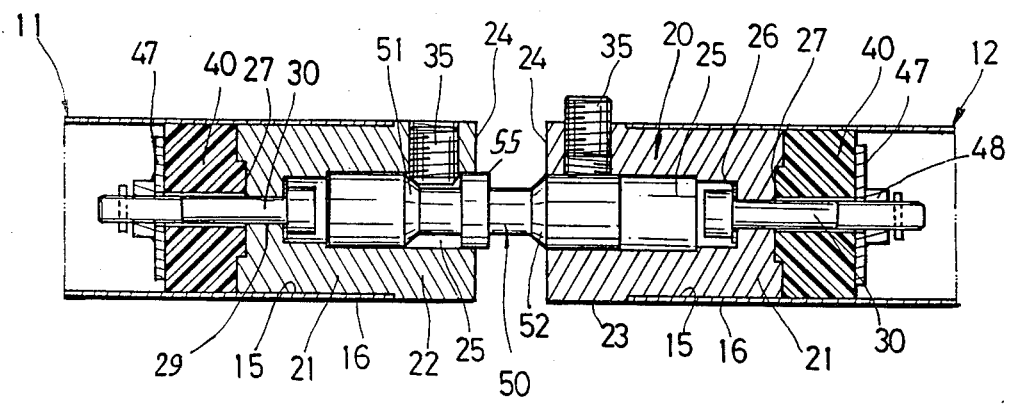
FiG. 2 is cross-secrional view showing the means for preparing longitudinally adjacent ends of the pipe structure to receive and co-act with the interconnecting structure.

Referring to FIGS. 2 and 3, a respective end bushing 20 is provided at the open end of each pipe 11 and 12. Each end bushing 20 comprises an insertion plug 21 which is inserted into the end of the respective pipe 11 or 12 and contacts the inner tube surface 15 of the pipe. The end bushing 20 also includes a brim part 22 attached to the plug 21 and having an outer peripheral surface 23 which has the same diameter and shape as the external tubular surface 16 of the pipe.

There is a cavity 25 extending from the axially outside terminal face 24 of the brim part 22 and extending axially in the direction of the pipe into the end bushing. A tightening screw 30, whose purpose is to tighten the compressive stopper member 40, described later, passes from the inner bottom surface 26 of cavity 25, through the bore 29 and is screwed through the terminal face 27 on the side of the insertion part 21.

Set screw 35 is inserted radially through a screw hole in the brim part 22 and into the cavity 25. It is operated from the outer peripheral surface 23.

The inside terminal face 27 of the plug 21 has a grade difference, caused by the cut part 28 shown in FIG. 3, making it possible to maintain strong cohesion with the compressive stopper member 40 at the time of tightening.

The compressive stopper member 40 is comprised of rubber or an elastomeric material whose main ingredient is rubber. It is resilient. Stopper 40 is arranged between the inside terminal face 27 of the plug 21 and the tightening seat plate 47 which is screw threadedly connected with the tightening screw 30. The compressive stopper member 40 is firmly compressed against the pipe inner tubular face 15 by its compressive deformation caused by tightening of the tightening seat plate 47 against the stopper member.

FIG. 4 shows the compressive deformation of the compressive stopper member 40. The compressive stopper member 40 has its circumferential surface 41 swollen outward by compressive forces P and P, which are shown by the arrow marks, between the plug terminal face 27 and the tightening seat plate 47.

FIG. 5 shows the alternate stopper member 40A which enhances that swelling and the resulting strong compressive force. The face of the member 40A is convexly curved toward the seat plate 47, as shown in FIG. 5. This increases the swelling of its periphery 41 upon tightening of the screw 30.

A firm compressive force against the inner tubular surface 15 of the pipe may alternatively be obtained by providing protuberant ring-shaped ribs 43 on the circumferential surface 41, like the ribs on compressive stopper member 40B in FIG. 6.

When the respective compressive stopper member 40 is tightly compressed to the inner tubular surface 15 of the pipe 11 or 12, the attached end bush 20 is firmly fixed to the respective pipe 11 and 12.

The connective rod 50 connects the two end bushing 20, which have already been firmly fixed to the end parts of two pipes 11 and 12, as described above. The connective rod 50 is symmetric along its length. On both sides of the central section 57 of rod 50, there are respective reduced diameter fixing parts 51 and 52 on the rods 50 which receive the respective fixing set screws 35 which are screwed into the end bushing brim parts 22.

Figure 7:
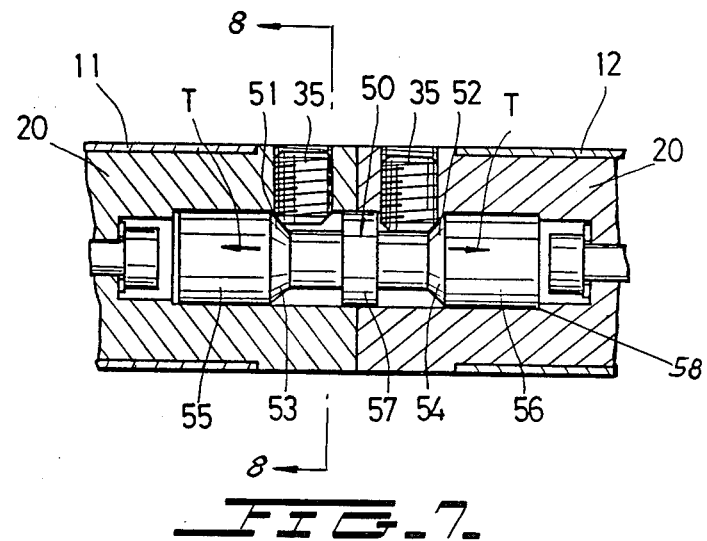
FIG. 7 is a cross-sectional view corresponding to that of FIG. 2 showing the interconnected structure.

Referring to FIG. 7, for fixing the connective rod 50, the tips of the set screws 35 which are tightened into the fixing parts 51 and 52 press against the tapered surfaces 53 and 54 which are on the axially outward edges of the fixing parts 51 and 52. This presses outward on the rod 50 in the directions of arrows t, which urges the pipes 11 and 12 toward each other to press together the outward terminal faces 24 of the brim parts 22.

Figure 8:
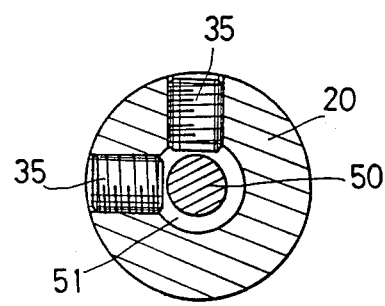
FIG. 8 is a cross-sectional view taken along line 8 in FIG. 7, showing the set screws in place.

A single set screw 35 might be used for the fixing part 51 or 52 for each end bush 20. When a stronger fixed structure is required, two fixing screws are used, arranged either at a right angle to each other, as shown in FIG. 8, or at some other suitable angle.

Referring to FIGS. 3 and 7, the insertion parts 55, 56 at both ends of connective rod 50 have the same diameter as central section 57 and have approximately the diameter of cavities 25, to be supported by the side walls of the cavities.

The assembly of the connector is now described.

Each end bushing 20 has a compressive stopper member 40 attached at its tip by the screw 30, but without the screw being tightened. End bushings 20 are inserted into the facing ends of each of the pipes 11 and 12 which are to be connected. Subsequent to the installation of the end bushings 20, with their brim parts 22 against the ends of the pipes 11 and 12, a screwdriver is inserted into the cavities 25 and the screws 30 are tightened. The compressive stopper members 40 are compressively deformed and firmly compressed to the inner tubular surfaces 15 of the pipes 11 and 12.

The pipes 11 and 12 are next joined to the connective rod 50. The insertion parts 55 and 56 at the ends of rod 50 are inserted into the, cavities 25 toward the shoulders 58 of the end bushings.

The set screw 35 of the end bushing 20 on the end of the pipe 12 is tightened first, so that the fixing part 52 of the connective rod is fixed. Thereafter, the pipe 11 receives the other end of the connective rod 50. Then the fixing part 51 is fixed by a set screw 35. As shown in FIG. 7, screw 35 presses against surface 53. Because the latter screw 35 does not bottom against the rod 50 in the fixing part 51, and the insertion part 55 does not press upon its shoulder 58, the brim parts 22 are securely urged and held together.

For dismantling the connecting structure, the mere loosening of one of the set screws 35 enables dismantling of the two pipes 11 and 12. Their reassembly can be carried out as above described. FIG. 2 shows a stage of both installation and dismantling. As a result of the foregoing construction it is possible to both assemble or dismantle the connective structure in a "one-touch" operation.

Although the present invention has been described in connection with a preferred embodiment thereof, many other variations and modifications will now become apparent to those skilled in the art without departing from the scope of the invention. It is preferred, therefore, that the present invention be limited not by the specific disclosure herein, but only by the appended claims.

What is claimed is:

1. A connector for connecting adjacent open ends of hollow pipes, which open ends face toward each other, the connector comprising:

a respective end bushing disposed in the facing open end of each of the pipes, each end bushing having a brim and the brim extends beyond the end of the pipe and toward the brim of the other end bushing, the brims having outward terminal end surfaces which abut when the pipes are connected with their open ends facing toward each other; each pipe having an interior surface and each end busing including a respective insertion plug extending into the respective pipe for resting against the interior surface of the pipe;

a cavity defined in each end bushing extending longitudinally of the end bushing and of the pipe from the terminal end surface of the brim into the bushing;

the insertion plug of each end bushing having an inward axial terminal face located in the pipe; a compressive stopper member disposed at the inward terminal face of the insertion plug of each end bushing; means disposed beyond each compressive stopper member for being compressed against the compressive stopper member for compressing the compressive stopper member to deform the compressive stopper member for swelling radially outwardly and for engaging the interior surface of the respective pipe;

a connective rod separate from the means disposed beyond the compressive stopper member, the connective rod including opposite end portions, respective insertion parts located at the end portions, each insertion part of the connective rod being installed in and entirely contained within a respective cavity of the end bushing; each end bushing including a respective means for fixing the connective rod to the end bushing and for also pushing the connective rod into the respective cavity, thereby urging the outward terminal end surfaces of the brims into secure engagement for securely connecting the pipes together.

2. The connector of claim 1, wherein the means disposed beyond the compressive stopper member comprises a plate and means for urging the plate against the stopper member for compressing the stopper member.

3. The connector of claim 2, wherein the means disposed beyond the compressive stopper member further comprises a screw accessible in the cavity and extending from the cavity to the plate for urging the plate to move to compress the stopper member.

4. The connector of claim 3, wherein the plate is on the side of the compressive stopper member away from the inward terminal face of the plug, such that tightening of the screw in the cavity draws the plate against the stopper member to compress the stopper member.

5. The connector of claim 2, wherein the compressive stopper member is comprised of resilient, elastomeric material.

6. The connector of claim 5, wherein the compressive stopper member has a convexly curved face toward the plate which is compressed against the compressive stopper member.

7. The connector of claim 5, wherein the compressive stopper member includes a plurality of ribs about its periphery for engaging the interior of the pipe when the compressive stopper member is compressed by the plate.

8. The connector of claim 1, wherein the means for fixing comprises a respective set screw at each end bushing for being moved radially into engagement with the connective rod.

9. The connector of claim 1, wherein the means for fixing comprises a respective means accessible from outside of the end bushing and movable radially into the end bushing for engagement with the connective rod.

10. The connector of claim 9, wherein the connective rod includes respective first tapered surfaces located in each of the cavities, and the accessible means having a respective second tapered surface; the first and second tapered surface being shaped and oriented so that movement of the accessible means into the cavities moves the tapered surface together for urging the connective rod into the cavities and thereby for urging the outward terminal end surfaces of the brims together.

11. The connector of claim 1, wherein the compressive stopper member is comprised of resilient, elastomeric material.

12. A connector for connecting adjacent open ends of hollow pipes, which open ends face toward each other, the connector comprising:

a respective end busing disposed in the facing open end of each of the pipes, each end bushing having a brim and the brim extends beyond the end of the pipe and toward the brim of the other end bushing, the brims having outward terminal end surfaces which abut when the pipes are connected with their open ends facing toward each other; each pipe having an interior surface and each end bushing including a respective insertion plug extending into the respective pipe for resting against the interior surface of the pipe;

a cavity defined in each end bushing extending longitudinally of the end bushing and the pipe from the terminal end surface of the brim into the bushing;

the insertion plug of each end bushing having an inward axial terminal face located in the pipe; a compressive stopper member disposed at the inward terminal face of the insertion plug of each end bushing; means disposed beyond each compressive stopper member for being compressed against the compressive stopper member for compressing the compressive stopper member to deform the compressive stopper member for swelling radially outwardly and for engaging the interior surface of the respective pipe;

a connective rod separate from the means disposed beyond the compressive stopper member, the connective rod including opposite end portions, respective insertion parts located at the end portions, each insertion part of the connective rod being installed in and entirely contained within a respective cavity of the end bushing;

each end bushing including a respective means accessible from outside of the end bushing and movable radially into the end bushing for engagement with the connective rod for fixing the connective rod to the end bushing and for also pushing the connective rod into the respective cavity; the connective rod inclusing respective first tapered surfaces located in each of the cavities, and the accessible means having a respective second tapered surface; the first and second tapered surfaces being shaped and oriented so that movement of the accessible means into the cavities moves the tapered surfaces together for urging the connective rod into the cavities and for urging the outward terminal end surfaces to the brims into secure engagement for securely connecting the pipes together;

the accessible means in each end bushing comprising a respective set screw disposed therein and a respective screw threaded receptacle in the end bushing for each set screw, the second tapered surface is defined on the set screw and the first tapered surface is defined on the connective rod for cooperating with the second tapered surface; and the set screws are so disposed with respect to the respective first tapered surfaces on the connective rod that tightening of the set screws pushes the respective tapered surfaces such that the connective rod is pushed into the cavities of the end bushings for driving the opposing outward terminal end surfaces of the brims together.

13. The connector of claim 12, wherein the connective rod includes a respective insertion part at each end thereof for insertion into the cavity of the respective end bushing, and includes the first tapered surfaces which are located inward, toward the center of the rod, from the respective insertion parts and the first tapered surfaces tapering toward each other.

14. The connector of claim 13, wherein the connective rod has reduced diameter fixing parts adjacent the respective first tapered surfaces, and the fixing parts are placed for receiving therein the respective set screws which are screwed into the fixing parts for enabling the second tapered surfaced of the set screws to engage the first tapered surfaces of the connective rods.

* * * * *